Figure 1:
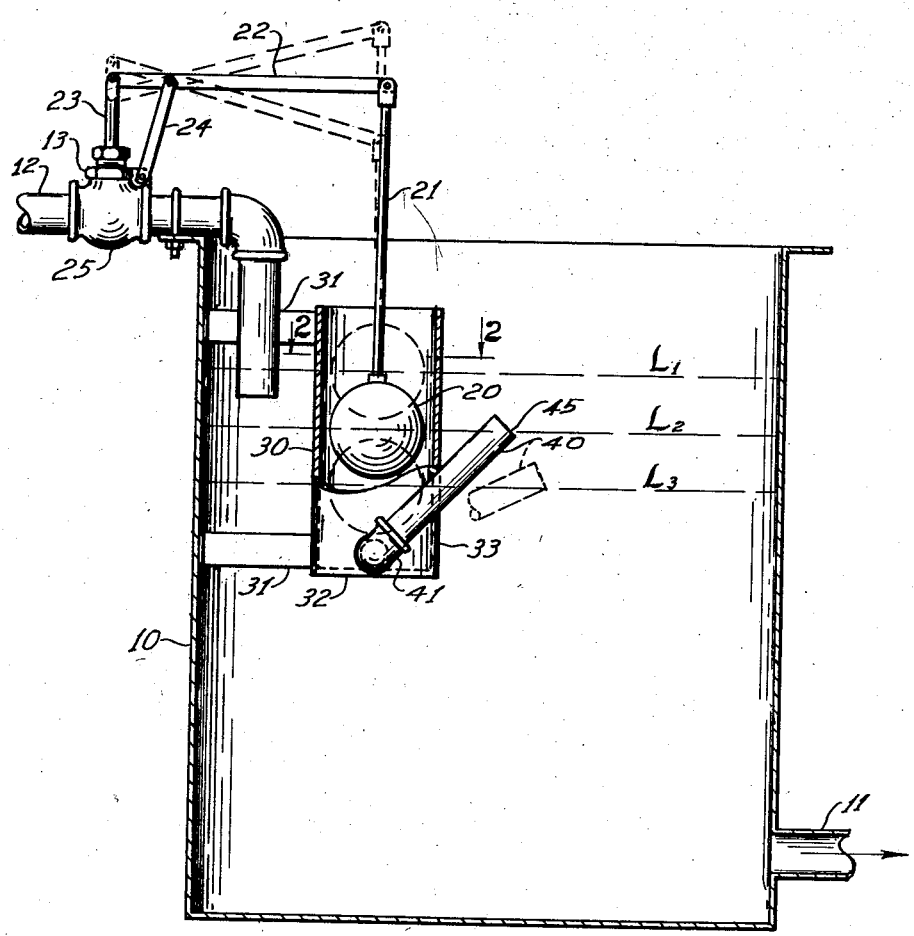

Oct. 23, 1956    A. B. HODGSON ET AL    2,767,732
FLOAT CONTROL DEVICE
Filed Feb. 3, 1955

United States Patent Office 2,767,732
Patented Oct. 23, 1956

2,767,732

FLOAT CONTROL DEVICE

Austin B. Hodgson and Robert J. Perry, Tucson, Ariz., assignors to Infilco Incorporated, Tucson, Ariz., a corporation of Delaware Application February 3, 1955, Serial No. 485,879

4 Claims. (Cl. 137—426)

This invention relates to control means for a valve regulating the flow of liquid into a vessel, such as a liquid treating tank, and more particularly to improved float control.

It is an object of this invention to provide an improved float control for regulating the flow of liquid into a container.

Another object of the invention is to provide means preventing a float-controlled valve to open beyond a predetermined rated capacity.

Another object of the invention is to provide for a valve regulating float means determining the lowermost position of the float independently of the actual elevation of the liquid surface in the tank.

Another object is to provide in a tank a float casing or chamber wherein an auxiliary body of liquid is maintained whose surface is at the same elevation as the surface in the tank from the predetermined maximum liquid level to a predetermined minimum level and remains at the predetermined minimum level when the liquid in the tank drops below the minimum level.

Other objects of the invention will become apparent from the specification and claims which follow.

Float-operated valves are used widely to regulate the inflow of liquid into vessels, such as for example, liquid treating tanks, to maintain the liquid level within predetermined elevations. The float is either mounted in the tank proper so as to ride on the liquid surface, or it is separated from the tank by an open bottom float chamber providing a stilling chamber, usually in the form of a tube surrounding the float and extending to an elevation above the predetermined maximum liquid level in the tank. In this case the float on the liquid surface in the tube, which is at the same elevation as the liquid surface in the tank.

Whether the float is in the tank proper or in a float chamber of this type, the float is arranged so that the inlet valve controlled by it is fully closed when the liquid reaches the predetermined maximum elevation. As the liquid level drops, the float riding on the liquid surface gradually opens the valve to admit liquid. At a predetermined lower elevation, the valve is opened to rated capacity. In most installations the valve opening at rated capacity does not correspond to the fully open position of the valve. Therefore, should the liquid level drop further, the float will sink further and open the valve beyond the rated capacity, until the float is in its lowermost position, where the valve is fully opened. Thereafter, further lowering of the liquid level does not affect the float, and, therefore, the valve, which remains wide open. Consequently, when the liquid level drops below the float, there is no control over the inlet rate until the liquid level has again reached the level of the float.

When the float valve is open beyond rated capacity due to the liquid level being below the predetermined minimum elevation, corresponding to rated capacity, the inlet rate, upon a sudden increase in the flow of incoming liquid, may far exceed the rated capacity of the apparatus. This is undesirable in many cases. For example, if a filter follows the tank, the filter may be damaged by a sudden surge of liquid. However, in the conventional float control valve no means are available to prevent the valve from opening beyond its rated capacity when the liquid level drops below the predetermined minimum elevation where the valve is open to rated capacity. Therefore, a sudden large inflow may occur with the valve too wide open. This objectionable condition is aggravated once the liquid level has fallen below the float, as in that case no control of the flow rate will occur before the liquid level has risen to the float, so that the flow may exceed rated capacity for a prolonged period.

We have found that this failure of prior float control devices to properly control the rate of inflow when the liquid level drops below the predetermined minimum elevation, can be eliminated by providing means whereby the liquid surface on which the float rides can be maintained at the predetermined minimum elevation, though the liquid surface in the tank drops below this elevation.

Figure 2:
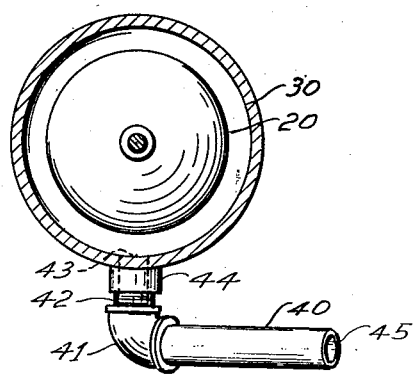

The invention will be more readily understood by reference to the drawing, wherein Figure 1 shows a vertical sectional view, partly in elevation, of a tank equipped with float control means according to the invention; and Figure 2 shows a horizontal sectional view, on an enlarged scale, of the float control means of Figure 1, the section being taken along line 2—2 of Figure 1.

The tank 10, which may have any desired shape, has a liquid outlet pipe 11 connected to its lower portion. Liquid enters the tank 10 through an inlet conduit 12, which is provided with a valve 13. The valve 13 is operated by a float 20 in known manner through linkage including a float stem 21, a link 22 pivoted to the stem 21 with one end and to a valve stem 23 with its other end, and a rod 24 pivoted to the valve body 25 with one end and with the other end to the link 22 at a point intermediate its ends. The linkage is arranged so that the valve 13 is fully closed when the float 20 is at the predetermined maximum liquid level $L_1$, as shown in dotted lines in Figure 1, and open to rated capacity when the float is at a predetermined minimum level $L_2$, as shown in full lines in Figure 1.

An open-top float casing 30, shown for purposes of illustration as cylindrical, surrounds the float 20 and is supported in the tank 10 by any suitable means, such as brackets 31. The chamber 30 has a bottom 32, located a suitable distance below the predetermined minimum liquid level in the tank 10, and a wall 33 extending upwardly from the bottom 32 to above the predetermined maximum liquid level $L_1$. The float chamber 30 is in hydraulic communication with the tank 10 through a swingable pipe 40. As shown in Figure 2, the pipe 40 is threaded into an elbow 41, which in turn is threadedly connected to a nipple 42, which registers with a port 43 in the wall 33 of the chamber 30. The nipple 42 may be supported in any suitable manner, such as by threading it into a supporting member 44, which is affixed, as by welding, to the wall 33 and surrounds the port 43.

The pipe 40 establishes in the float chamber 30 a liquid level which is at the same elevation as the liquid level in the tank, as long as the end 45 of the pipe is submerged within the liquid in the tank 10. When the liquid level in the tank drops below the end 45 of pipe 40, the liquid level in the float chamber is not affected thereby, but remains at the elevation of the end 45 of the pipe 40. By positioning the end 45 of pipe 40 at a predetermined elevation, such as, for example, at $L_2$, a corresponding minimum liquid level in float chamber 30 is established, and a valve opening corresponding to the set minimum liquid level can be maintained, while the liquid level in the tank drops below the predetermined minimum. The location of the minimum liquid level in the float chamber 30 can be varied in accordance with the needs of individual installations or with changing conditions in any one installation by simply swinging the pipe 40 into a position so that its end 45 is at the desired elevation. For example, if it is desired to maintain the minimum liquid level at L3 the pipe 40 is swung to the position shown in dotted lines in Figure 1. The position of the float and linkage corresponding to this position of pipe 40 are shown in dotted lines.

While the float 20 has been illustrated for purposes of exemplification as directly linked to a valve, obviously the float may position by its movements an electrical, pneumatic or hydraulic device which operates a valve. Further, while for the sake of clarity and simplicity the valve controlled by the float has been shown associated with the inlet conduit of the tank, wherein the float is mounted, the valve controlled by the float may be the inlet valve of a preceding tank. For example, a surge tank is frequently interposed between a liquid treating tank and a filter. The tank 10 may embody such a surge tank, in which case the valve ordinarily would be associated with the preceding liquid treating tank.

It will be seen that the invention provides a simple and reliable remedy for the failure of prior float control devices to control the position of an inlet valve when the liquid level drops below the predetermined minimum elevation.

We claim:

1. In a liquid container including a float adapted to position means controlling the rate of inflow to said container, the combination with said float of a float chamber supported in said container and housing said float, said float chamber having a closed bottom at an elevation subjacent the predetermined minimum liquid level in said container, and a side wall extending from said bottom to an elevation above the predetermined minimum liquid level in said container, and a pipe in said container and swingably connected with one end with said float chamber and establishing hydraulic communication between said container and said float chamber, the free end of said pipe being located at said predetermined minimum level.

2. In a liquid container including a float adapted to position means controlling the rate of inflow to said container, the combination with said float of a float chamber supported in said container and housing said float, said float chamber having a closed bottom at an elevation subjacent the predetermined minimum liquid level in said container, and a side wall extending from said bottom to an elevation above the predetermined maximum liquid level in said container, a port in the lower portion of said wall, an open ended pipe in said container, support means swingably connecting one end of said pipe to said port, the other end of said pipe being located at said predetermined minimum level, whereby said float remains at an elevation corresponding to said predetermined minimum level when the liquid level in said container drops therebelow.

3. In a container for liquid having an outlet from its lower portion and including a float controlling the opening of an inlet valve to said container, said valve being fully closed when said float is in a predetermined upper position, and being open to rated capacity when said float is in a predetermined lower position, the combination with said float of means operative to maintain said float in said predetermined lower position when the liquid surface in said container drops to an elevation below said lower position, said means comprising a float chamber fixedly supported in said container and housing said float, said float chamber having a closed bottom at an elevation subjacent the predetermined lowermost position of said float, and a side wall extending from said bottom to an elevation above the predetermined maximum liquid level in said container, a port in the lower portion of said wall, an open ended pipe in said container, and means swingably connecting one end of said pipe to said port, the other end of said pipe being positioned at the elevation of said predetermined lower position.

4. In a container for liquid having an outlet from its lower portion and including a float controlling the position of an inlet valve to said container, said valve being fully closed when said float rides on a predetermined maximum liquid level and being open to rated capacity when said float rides on a predetermined minimum liquid level, the combination with said float of a float chamber supported in said container and housing said float, said float chamber having a closed bottom at an elevation subjacent said predetermined minimum liquid level, and a side wall extending from said bottom to an elevation above said predetermined maximum liquid level, and means operative to establish and maintain said predetermined minimum liquid level in said float chamber when the liquid level in said container drops below said predetermined minimum level, comprising a port in the lower portion of said wall, and a pipe in said container swingably connected at one end with said port and establishing hydraulic communication between said container and said float chamber, the other end of said pipe being located at said predetermined minimum level.

References Cited in the file of this patent

UNITED STATES PATENTS

| | | |
|---|---|---|
| 1,037,679 | Snyder | Sept. 3, 1912 |
| 1,465,475 | Hope | Aug. 21, 1923 |
| 2,068,090 | Stilphen | Jan. 19, 1937 |

FOREIGN PATENTS

| | | |
|---|---|---|
| 717,122 | France | Oct. 19, 1931 |